US007822970B2

(12) United States Patent
Burstein

(10) Patent No.: US 7,822,970 B2
(45) Date of Patent: Oct. 26, 2010

(54) METHOD AND APPARATUS FOR REGULATING ACCESS TO A COMPUTER VIA A COMPUTER NETWORK

(75) Inventor: Jonathan Burstein, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 2258 days.

(21) Appl. No.: 10/000,606

(22) Filed: Oct. 24, 2001

(65) Prior Publication Data

US 2003/0079146 A1  Apr. 24, 2003

(51) Int. Cl.
*G06F 15/16* (2006.01)
*H04L 29/06* (2006.01)

(52) U.S. Cl. .................... 713/152; 713/153; 726/12; 726/13; 726/27

(58) Field of Classification Search .................. 713/201; 709/225, 227, 239, 203; 370/400–401
See application file for complete search history.

(56) References Cited

U.S. PATENT DOCUMENTS

| | | | | |
|---|---|---|---|---|
| 5,896,499 A * | 4/1999 | McKelvey | .................. | 713/201 |
| 6,003,084 A * | 12/1999 | Green et al. | ................. | 709/227 |
| 6,131,163 A * | 10/2000 | Wiegel | ......................... | 726/12 |
| 6,219,706 B1 * | 4/2001 | Fan et al. | .................... | 709/225 |
| 6,772,347 B1 * | 8/2004 | Xie et al. | .................... | 713/201 |
| 6,795,923 B1 * | 9/2004 | Stern et al. | .................. | 713/201 |
| 7,051,111 B1 * | 5/2006 | Scullin | ....................... | 709/232 |

OTHER PUBLICATIONS

CERT® Coordination Center, "*Problems with the FTP PORT Command or Why You Don't Want Just Any PORT in a Storm*", retrieved from http://www.cert.org/tech_tips/ftp_port_attackes.html on Jun. 27, 2001, pp. 1-6.
Northrup, Anthony, "*NT Network Plumbing: Routers, Proxies, and Web Services*", 1998, Chapter 18: HTTP Proxy Services, pp. 539-541.
Conoboy, Brendan, et al., "*IP Filter-Based Firewalls HOWTO*", 2001, pp. 1-30.
Thomas, Tracy T., "*Protocols support home gatewy apps.(Technology Information)*", ISSN: 0192-1541, (Feb. 28, 2000) retrieved from DialogWeb on Jun. 25, 2001, pp. 1-3.
Bellovin, S., "*Firewall-Friendly FTP*", Network Working Group, RFC 1579 Feb. 1994, pp. 1-4.
Resources-KnowledgeShare, *Firewall Q & A*, retrieved from http://www.vicomsoft.com/knowledge/reference/firewalls1.html?track=internal on Jun. 25, 2001, pp. 1-11.

* cited by examiner

*Primary Examiner*—Kaveh Abrishamkar

(57) ABSTRACT

A method and apparatus for regulating access to a computer via a computer network is provided, in which a local computer has an application program, a proxy program, and a firewall program. The proxy program monitors the communication between the application program and the computer network, and is able to detect when the application program requires a remote computer to initiate a new connection to the local computer. Upon detecting such a need, the proxy program changes the settings of the firewall program so that the remote computer is able to establish the new connection.

22 Claims, 8 Drawing Sheets

METHOD AND APPARATUS FOR REGULATING ACCESS TO A COMPUTER VIA A COMPUTER NETWORK

TECHNICAL FIELD

The invention relates generally to protecting a computer from unauthorized network access and, more particularly, to the use of proxies, firewalls, and their equivalents to regulate access to a computer via a computer network.

BACKGROUND OF THE INVENTION

With the increasing availability of broadband internet access, home computer users are starting to encounter many of the same security issues that corporate networks have faced for years. In particular, since broadband connections, such as DSL and cable, allow users to be connected to the Internet for extended periods of time, home users now have to consider how to prevent would-be hackers from gaining access to their computers. The most common solution to this problem is to install a firewall program. A firewall program is a type of security program that filters outbound IP and TCP communication packets before they leave the computer and travel out to a network, such as the Internet, and inbound communication packets received from the network. A firewall generally operates according its settings, which may be implemented as a set of rules. An example of a rule that might be used by a firewall is "Block all inbound packets coming from network card 001 that originate from IP address 10.0.0.1 and TCP port 3000".

To maximize security, the settings of consumer-oriented firewalls are often configured so as to block all inbound, unsolicited communication packets from the Internet. While this helps to prevent unauthorized entries by hackers, it also creates a problem for those application program that require a "call back" from another computer in order to establish a communication session. An example of such an application program is a File Transfer Protocol (FTP) client. For an FTP client program to retrieve files over the Internet FTP "PORT" command, ask the FTP host to initiate or "call back" the FTP client on a second TCP port. If the FTP client is operating behind a typically-configured firewall, the FTP host's attempts to connect back to the FTP client on the second TCP port will be blocked by the firewall, the attempt by the FTP client to transfer files will fail.

Some firewalls attempt to address this problem by maintaining data on where outbound TCP and IP packets are going and what kind of packets they are. However, because most firewalls operate down at the TCP and IP layers of the network communication stack, they have little or no knowledge about what the application programs are trying to do when they send and receive messages.

SUMMARY OF THE INVENTION

In accordance with the foregoing, a method and apparatus for regulating access to a computer via a computer network is provided. According to an embodiment of invention, a local computer has an application program, a proxy program, and a security program. The proxy program monitors the communication between the application program and the computer network, and is able to detect when the application program requires a remote computer to initiate a new connection to the local computer. Upon detecting such a need, the proxy program changes the settings of the security program so that the remote computer is able to establish the new connection. The invention allows programs such as a File Transfer Protocol (FTP) program to function while still maintaining a reasonable degree of security.

There are a variety of possible implementations for the security program, including a firewall program. According to various embodiments, the security program operates according to a set of rules, and changing the settings of the security program involves adding a new rule to a set of rules that governs the operation of the security program. For example, when the proxy program detects that a new inbound connection is required, it adds a new rule that specifies that a new inbound connection is to be permitted.

Additional features and advantages of the invention will be made apparent from the following detailed description of illustrative embodiments that proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

The invention is generally directed to a method and apparatus for regulating access to a computer over a computer network. According to the invention, an application program running on a local computer communicates with a network via a proxy program residing on the local computer. The proxy program acts as an intermediary between the application program and a firewall program that also resides on the local computer. The proxy program is able to determine when the application requires an inbound connection originating from another computer on the network, and to adjust the settings of the firewall program so as to allow the inbound connection. The invention allows protocols such as FTP to function correctly while still maintaining a high level of security.

Although it is not required, the present invention may be implemented by program modules that are executed by a computer. Generally, program modules include routines, objects, components, data structures and the like that perform particular tasks or implement particular abstract data types. The term "program" as used herein may connote a single program module or multiple program modules acting in concert. The invention may be implemented on a variety of types of computers, including personal computers (PCs), handheld devices, multi-processor systems, microprocessor-based programmable consumer electronics, network PCs, minicomputers, mainframe computers and the like. The invention may also be employed in distributed computing environments, where tasks are performed by remote processing devices that are linked through a communications network. In a distributed computing environment, modules may be located in both local and remote memory storage devices.

Figure 1:
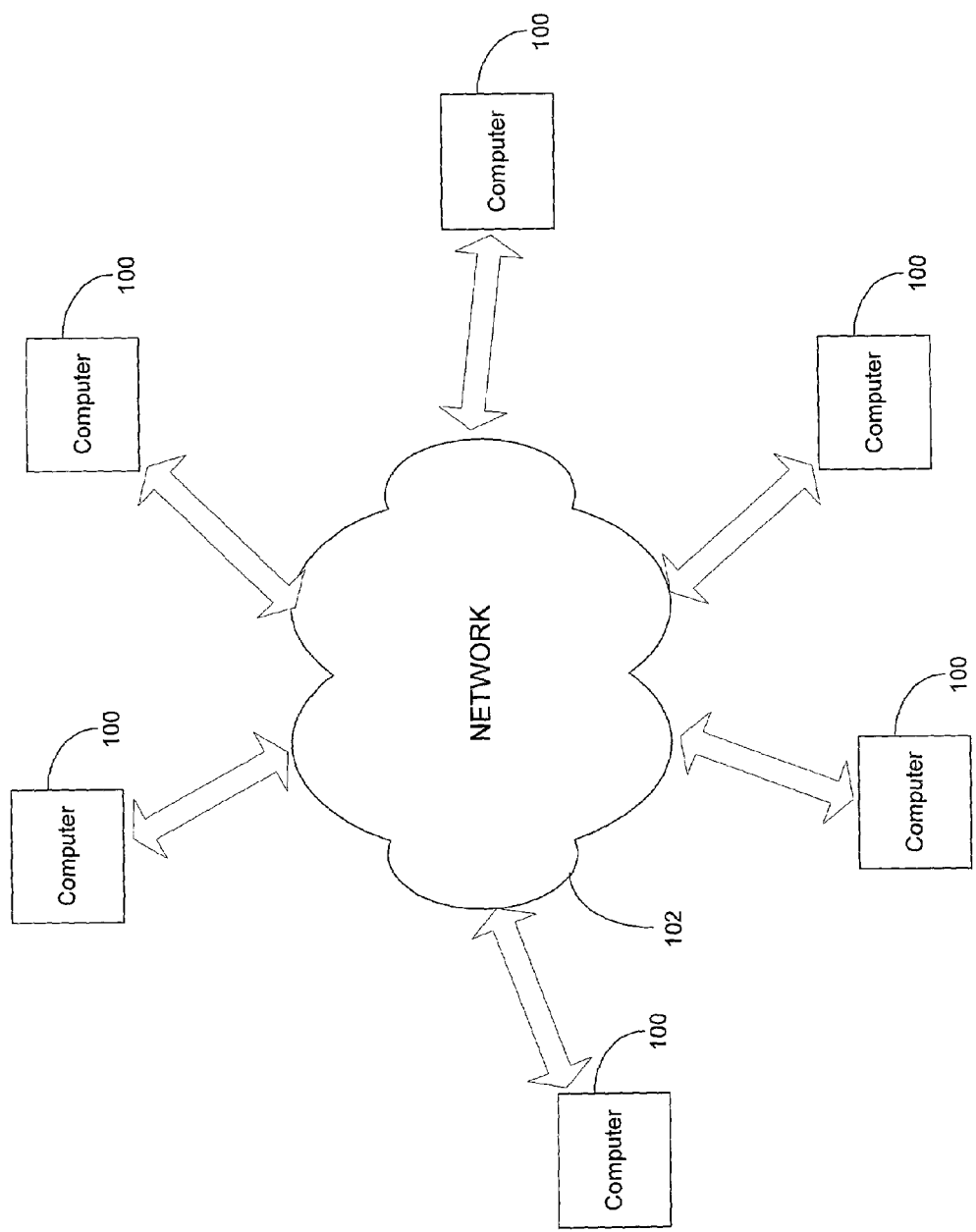
FIG. 1 is an example of a computer network.

An example of a networked environment in which this system may be used will now be described with reference to FIG. 1. The example network includes several computers 100 communicating with one another over a network 102, represented by a cloud. Network 102 may include many well-known components, such as routers, gateways, hubs, etc. and may allow the computers 100 to communicate via wired and/or wireless media.

Figure 2:
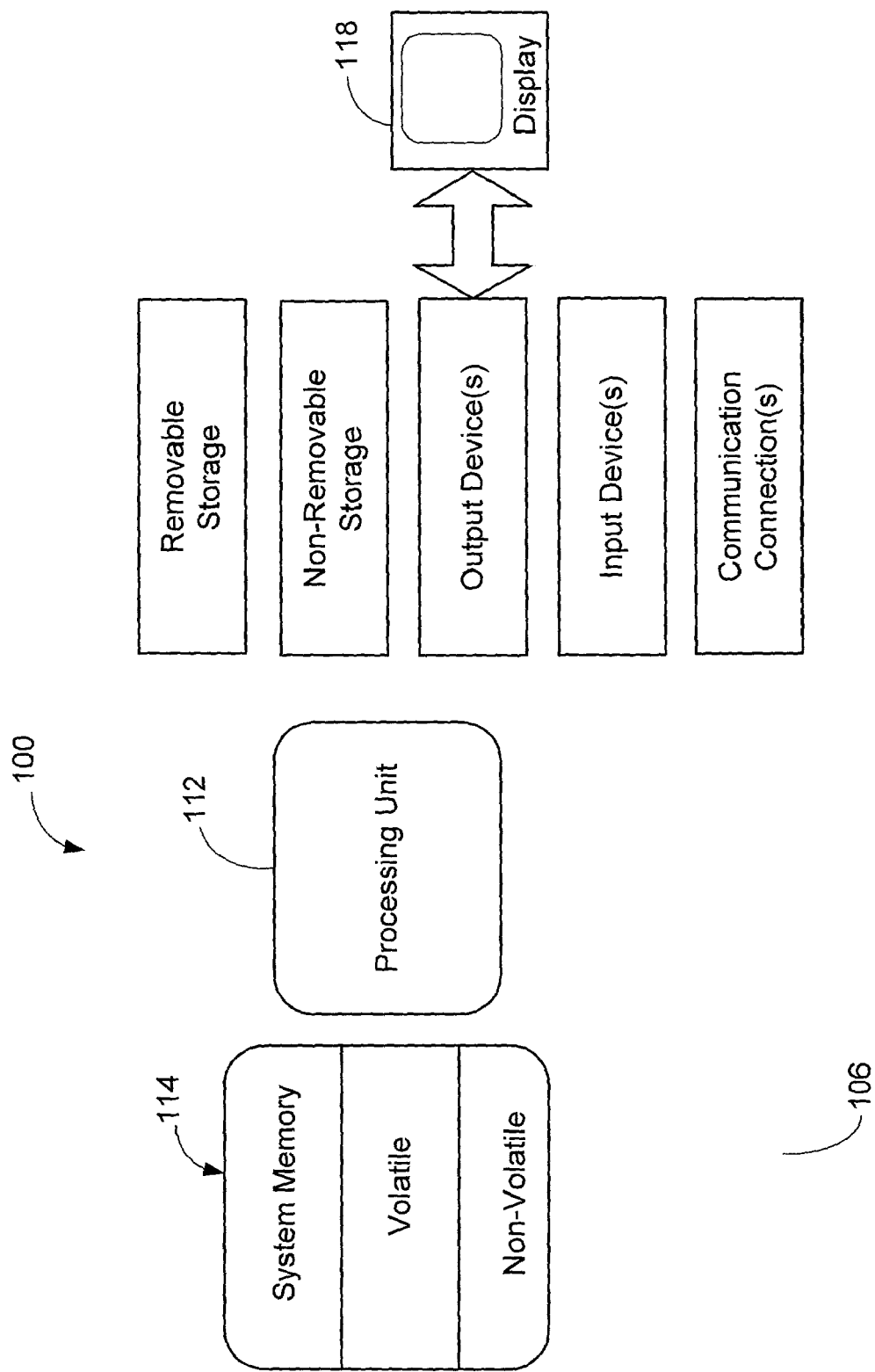
FIG. 2 is an example of a computer.

Referring to FIG. 2, an example of a basic configuration for a computer on which the system described herein may be implemented is shown. In its most basic configuration, the computer 100 typically includes at least one processing unit 112 and memory 114. Depending on the exact configuration and type of the computer 100, the memory 114 may be volatile (such as RAM), non-volatile (such as ROM or flash memory) or some combination of the two. This most basic configuration is illustrated in FIG. 2 by dashed line 106. Additionally, the computer may also have additional features/functionality. For example, computer 100 may also include additional storage (removable and/or non-removable) including, but not limited to, magnetic or optical disks or tape. Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to stored the desired information and which can be accessed by the computer 100. Any such computer storage media may be part of computer 100.

Computer 100 may also contain communications connections that allow the device to communicate with other devices. A communication connection is an example of a communication medium. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. The term computer readable media as used herein includes both storage media and communication media.

Computer 100 may also have input devices such as a keyboard, mouse, pen, voice input device, touch input device, etc. Output devices such as a display 116, speakers, a printer, etc. may also be included. All these devices are well known in the art and need not be discussed at length here.

Figure 3:
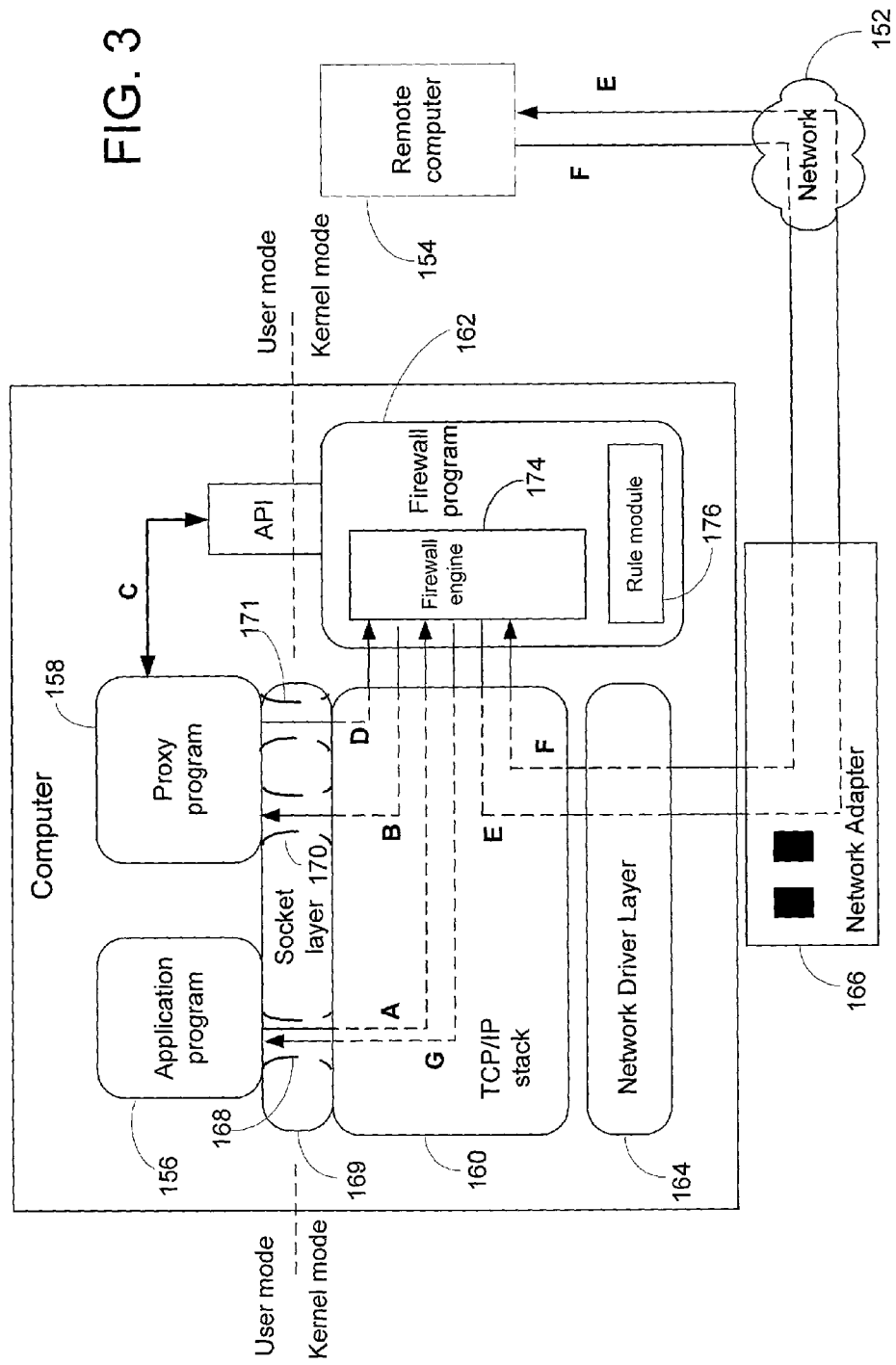
FIG. 3 shows an example of how access to a local computer is regulated according to an embodiment of the invention.

An example of how access to a local computer is regulated according to an embodiment of the invention will now be described. Referring to FIG. 3, a local computer, generally labeled 150 is shown. The local computer 150 is communicatively linked to a network 152, which may be embodied as described in conjunction with the network 102. To help illustrate the operation of the invention, a remote computer 154 is also depicted in FIG. 3 as being communicatively linked to the network 152. The terms "local" and "remote" are not meant to connote any particular distance that exists between the local computer 150 and remote computer 154, but are only meant to indicate that they are recognized as different nodes on the network 152. The remote computer 154 may be any physical distance from the local computer 150.

The local computer 150 includes a network adapter 166 for providing the physical link to the network 152. Both the local computer 150 and the remote computer 154 may have many or all of the elements described in conjunction with FIG. 2. The programs running on the computer 150 include an application program 156, a proxy program 158, a TCP/IP stack 160, a firewall program 162, a socket layer 169, and one or more network drivers 164. The application program 168 may be implemented as any kind of program that sends and/or receives messages over the network 152. Furthermore, the application program 156 may act as a server process, client process or as a peer process. The proxy program 158 acts as an intermediary between the application program 156 and the network 152. A dashed line helps illustrate an abstract boundary between the user mode components of the various programs and the kernel mode components that reside on the local computer 150.

Referring again to FIG. 3, the application program 156 communicates with the TCP/IP stack 160 via a socket 168 defined in the socket layer 169. The proxy program 158 communicates with the TCP/IP stack 160 via sockets 170 and 171, also defined in the socket layer 169. The proxy program 158 sends messages generated by the application program 156 to the network 152 in a way that is transparent to the application program 156. Thus, the application program 156 simply sends messages to the socket 168 as if they were going directly to the network 152.

The firewall program 162 includes a firewall engine 174 and a rule module 176 that defines a set of rules that the firewall engine uses when determining what to do with inbound and outbound communication packets. The firewall 162 acts to filter communication packets, such as IP packets, as they travel through the TCP/IP stack 160. More specifically, all IP packets that originate from the application program 156, the proxy program 158, or that are received by the computer 150 via the network 152 are filtered by the firewall 162. The proxy program 158 calls functions of the firewall program 162 via an application programming interface (API) 172.

The firewall engine 174 may be implemented in a variety of ways. In one embodiment, the firewall engine 174 is a Network Address Translation (NAT) module. When implemented as a NAT module, the firewall engine 174 processes each IP packet it receives by examining the IP headers and the TCP or UDP headers to determine the source and destination IP address and the source and destination TCP or UDP ports. It then looks in the rule module 176 to locate a rule governing where the packet should be forwarded. The firewall engine 174 then edits the TCP or UDP headers and the IP headers to give the packet the destination TCP or UDP port and the destination IP address specified by the located rule.

The TCP/IP stack 160 includes programs for formatting messages into IP packets. As is well-known, formatting messages into IP packets includes dividing messages into smaller parts and adding the appropriate headers, such as TCP or UDP headers and IP headers. The TCP/IP stack 160 also performs the reverse function of reassembling messages that are received as IP packets. The network driver layer 164 includes programs for assembling IP packets into frames, such as Ethernet frames, for transmission out to the network 152, and for extracting individual IP packets from frames received from the network 152. Finally, the network adapter 166 is a piece of hardware that actually transmits the frames received from the network driver layer 164 out to the network 152, and passes frames received from the network 152 to the network driver layer 164. The network adapter 166 may be implemented in a variety of ways, including an Ethernet card, and a wireless network card.

Referring again to FIG. 3, an example of how data flows according to an embodiment of the invention will now be described. In this example, the application program 156 attempts to send a message to the computer 154, and the message includes a request for the computer 154 to initiate communication back to the application program 156. It is assumed that the rule module 176 initially includes a first rule 180 that all packets received from the application program 156 are to be forwarded to the proxy program 158. First, the application program 156 forms the message and passes it down through the socket 168. The message is then passed through the TCP/IP stack 160, and to the firewall program 162 (arrow A). The firewall engine 174 sends the message through the TCP/IP stack 160, the socket 171 and to the proxy program 158 according to the first rule 180 (arrow B). The proxy program 158 analyzes the message and determines that the application program 156 is requesting that some process running on the remote computer 154 initiate contact with the application program 156, and that the request is proper. Based on this determination, the proxy program 158 adds two new rules to the rule module 176 via the API 172 (arrow C). The first new rule specifies that firewall engine 174 is to allow packets originating from the remote computer 154 and destined for the application program 156 are to be permitted to pass through. The second new rule specifies that packets originating from the proxy program 158 and destined for the remote computer 154 are to be sent to the remote computer 154. This prevents the firewall program 162 from bouncing the message back to the proxy program 158. The proxy program 158 then sends the message through the TCP/IP stack 160 via the socket 171 (arrow D). The message reaches the firewall program 162 in packetized form. The firewall engine 174 processes the packetized message according to the set of rules in the rule module 176. Based on the second new rule, the firewall engine 174 sends the message through the TCP/IP stack 160, the network driver layer 164, the network adapter 160 and out to the network 152 (arrow E). The message eventually reaches the remote computer 154.

The remote computer 154 then responds to the message by attempting to connect back to the application program 156. Specifically, the remote computer 154 sends a connect message to the computer 150 over the network 152 (arrow F). The message is passed through the network adapter 166, up the network driver layer 164, through the TCP/IP stack 160 and to the firewall program 162. The firewall engine 174 then processes the packetized message according to the first new rule. Specifically, the firewall engine 174 sends the message to the application program 156 (arrow G). After this point, the application program and the remote computer 154 can communicate normally. After the application program 156 and the remote computer 154 are finished communicating, the first and second new rules expires, and the firewall program 162 returns to its original state.

Figure 4:
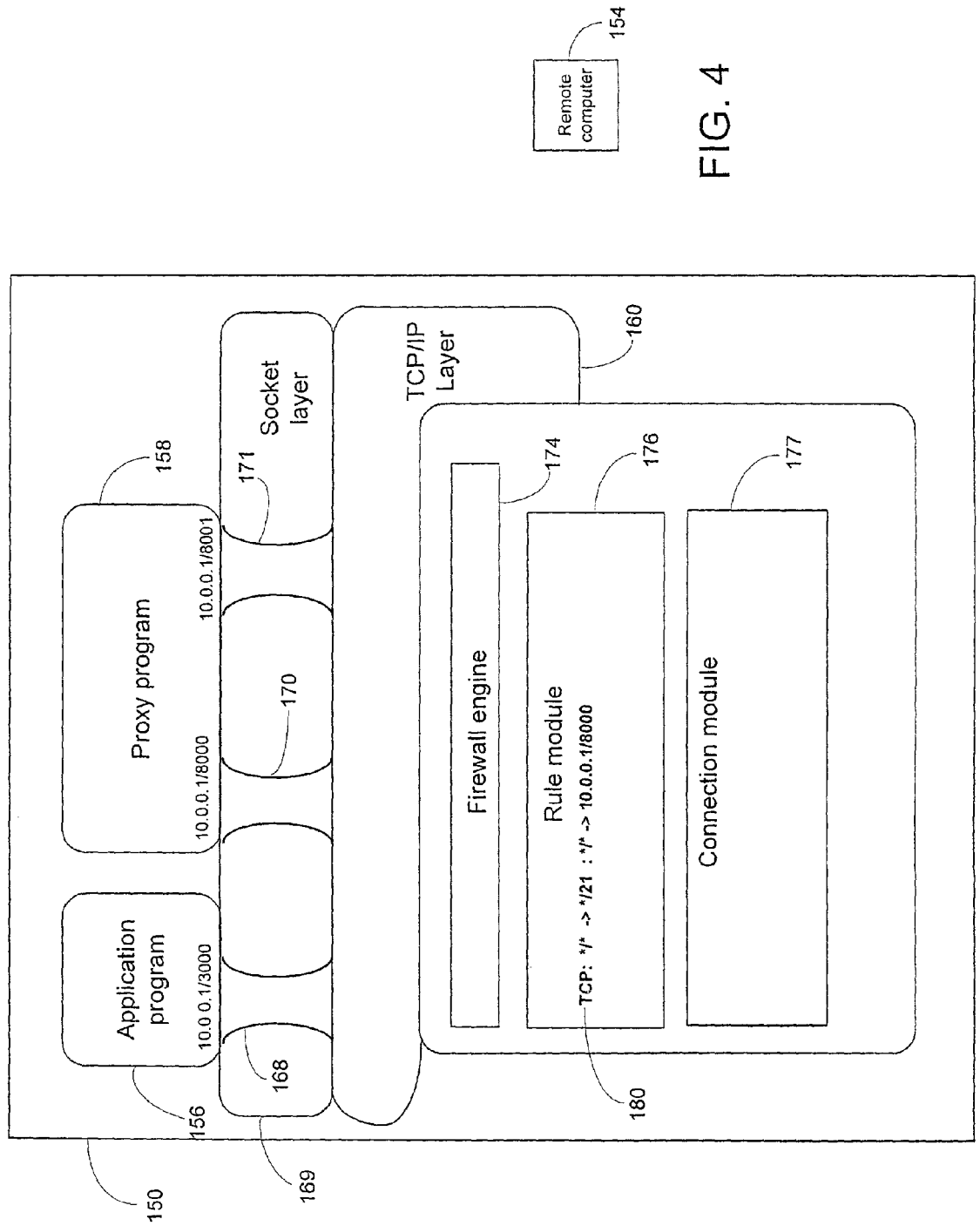
FIGS. 4-8 show a more detailed example of how access to a computer is regulated in accordance with an embodiment of the invention.

A more detailed example of how access to a computer is regulated in accordance with an embodiment of the invention will now be described with reference to FIGS. 4-9. In this example, the application program 156 includes an FTP client, and the proxy program 158 includes an FTP proxy. The firewall program 162 also includes a connection module 177 that keeps track of the active connections. For each active connection, the connection module has a corresponding connection entry. When determining whether to permit or bock packets, the firewall engine 174 first refers to the connection module 177 to determine if the packets correspond to any active connection entry. If it does, then the packet is translated as specified by the corresponding connection entry and is permitted to pass. If not, then the firewall engine 174 refers to the rule module 176 to determine whether a rule applies to the packets. If a rule is found to apply, then the firewall engine 174 processes the packets according to the rule. In their initial state, shown in FIG. 4, the application program 156 communicates with the TCP/IP stack 160 via a socket 168 defined for IP address 10.0.0.1, TCP port 3000 (10.0.0.1/3000). The proxy program 158 communicates with the TCP/IP stack 160 via a first socket 170 defined for address 10.0.0.1/8000, and via a second socket 171 defined for address 10.0.0.1/8001. The rule module 176 includes a rule 180 that indicates to the firewall engine 174 that all IP packets, regardless of their source IP address and source port, that have port 21 as their destination port are to be forwarded to address 10.0.0.1/8000. As shown in FIG. 4, this rule uses the asterisk symbol as a wildcard.

Figure 5:
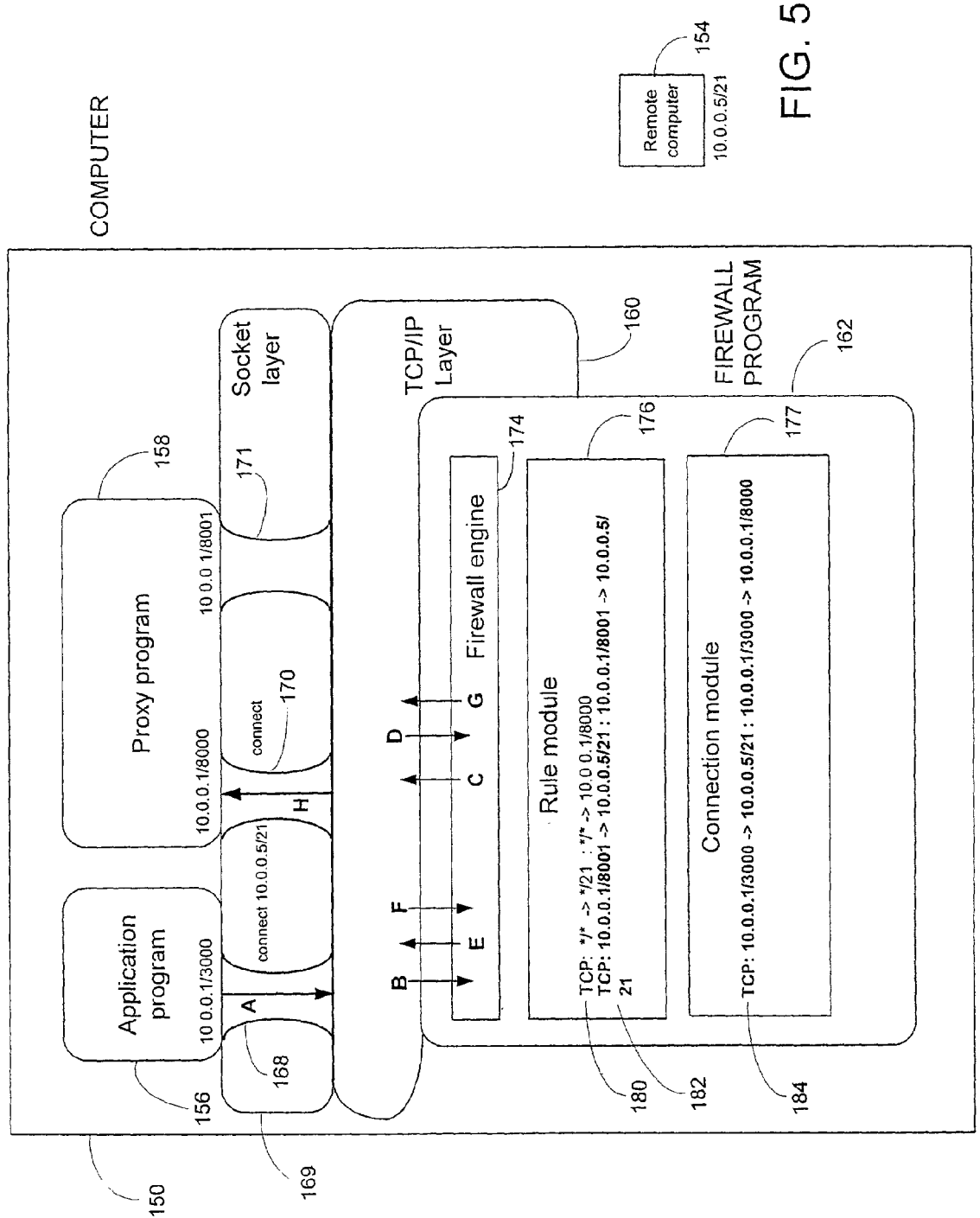

Referring to FIG. 5, the process begins when a user (not shown) at the computer 150 enters the command "FTP 10.0.0.5." The application program 156 responds by sending a request for a connection to address 10.0.0.5/21 to the TCP/IP stack 160 via the socket 168 (arrow A). Port 21 is a well-known port used by FTP servers to receive messages. The TCP/IP stack 160 responds by generating a SYN packet having a source address of 10.0.0.1/3000 and a destination address of 10.0.0.5/21 (arrow B). The SYN packet is then sent to the firewall program 162. The firewall engine 174 refers to the rule module 176 to determine if there are any rules to use in processing the SYN packet. The firewall engine 174 finds the rule 180, and redirects the SYN packet to address 10.0.0.1/8000 (arrow C). The firewall engine 174 then creates a connection entry 184 in the connection module 177 to indicate that a connection is being set up between 10.0.0.1/3000 and 10.0.0.1/8000. The TCP/IP stack 160 responds by generating a SYN/ACK packet having a source address of 10.0.0.1/8000 and a destination address of 10.0.0.1/3000 (arrow D). The SYN/ACK packet is then sent to the firewall program 162. The firewall engine 174 then redirects the SYN/ACK packet to address 10.0.0.1/3000 according to the first connection entry 184 (arrow E). The TCP/IP stack 160 responds by generating an ACK packet having a source address of 10.0.0.1/3000 and a destination address of 10.0.0.5/21 and sending the ACK packet to the firewall program 162 (arrow F). The firewall engine 174 redirects the ACK packet to address 10.0.0.1/3000 according to the first connection entry 184 (arrow G). At this point, the TCP handshake is complete and the proxy program 158 accepts the connection.

The proxy program then makes a function call to the socket layer 169 for the purpose of finding out the source IP address and source port of the connect attempt. The proxy program 158 then calls the firewall program 162 to find out the original destination IP address and destination port of the connection attempt. The socket layer informs the proxy program 158 that the original source address is 10.0.0.1/3000, and the firewall program 162 informs the proxy program 158 that the original destination address is 10.0.0.5/21. The proxy program 158 responds by making a call to the firewall program 162 to have a new, second rule 182 entered into the rule module 176. The second rule 182 specifies that any packet having a source address of 10.0.0.1/8001 and a destination address of 10.0.0.5/21 is to be redirected to address 10.0.0.5/21. In effect, the proxy program 158 tells the firewall program 162 to simply pass such packets to their original destination without modification. Because the second rule 182 is more specific than the first rule 180, the second rule 182 takes precedence over the first rule 180.

Figure 6:
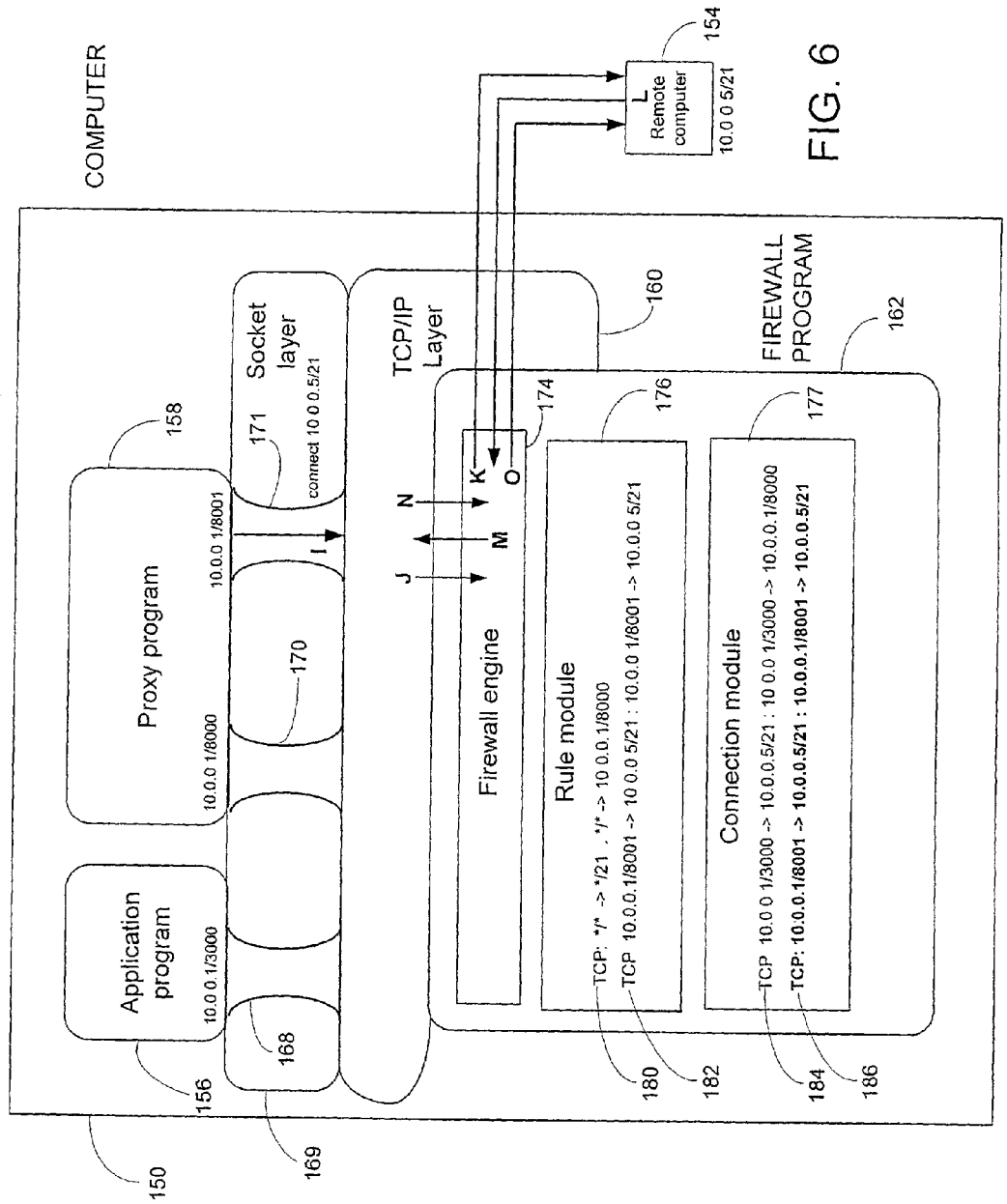

As shown in FIG. 6, the proxy program 158 then sends a request for a connection to address 10.0.0.5/21 to the TCP/IP stack 160 via the socket 171 (arrow I). The TCP/IP layer 160 responds by generating a SYN packet having a source address of 10.0.0.1/8001 and a destination address of 10.0.0.5/21 (arrow J). The SYN packet reaches the firewall program 162. The firewall engine 174 processes the SYN packet by creating a second connection entry 186 in the connection module 177 to indicate that a connection is being established between 10.0.0.1/8001 and IP address 10.0.0.5/21. The firewall engine 174 then refers to its rule module 176 to determine if there are any rules to use in processing the SYN packet. The firewall engine 174 finds the second rule 182, and "redirects" the SYN packet to remote computer 154 via the TCP/IP stack 160 (arrow K).

Referring again to FIG. 6, the remote computer 154 responds with a SYN/ACK packet (arrow L). The SYN/ACK packet reaches the firewall program 162 via the TCP/IP stack 160. The firewall engine 174 refers to the connection module 177 to determine whether there are any entries that apply to the SYN/ACK packet. The firewall engine 174 finds the second connection entry 186 and, accordingly, allows the SYN/ACK packet to proceed to address 10.0.0.1/8001 (arrow M). The SYN/ACK packet reaches the TCP/IP stack 160. The TCP/IP stack 160 responds by generating an ACK packet having a source IP address of 10.0.0.1/8001 and a destination IP address of 10.0.0.5/21, and passing the packet to the firewall program 162 (arrow N). The firewall engine 174 refers to the connection module 177 to determine whether there are any entries that apply to the ACK packet. The firewall engine 174 finds the second connection entry 186 and, accordingly, sends the ACK packet to the remote computer 154 (arrow O). At this point, this TCP/IP handshaking between the remote computer 154 and the TCP/IP layer 160 of the local computer 150 is complete.

Figure 7:
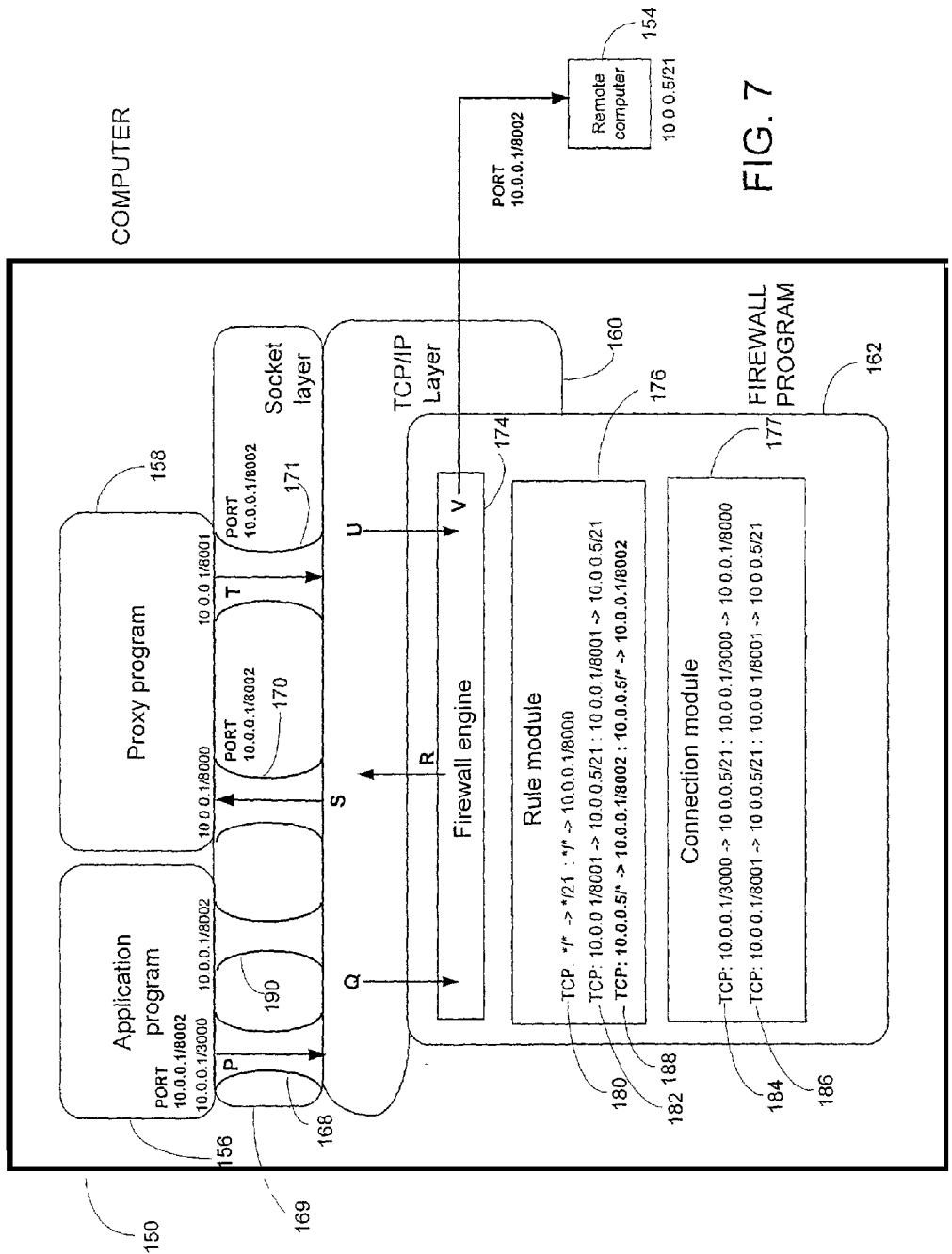

Referring to FIG. 7, it is now assumed that the user enters the FTP command DIR at the computer 150. This command indicates that the user wishes to obtain a file directory listing from the remote computer 154. As is standard in FTP communication, the application program 156 needs the remote computer 154 to initiate communication back local to the computer 150 at a port designated by the application program 156 for the purpose of transmitting the directory listing to the local computer. The application program 156 therefore generates a PORT command and sends it to the TCP/IP stack 160 via the first socket 168 (arrow P). The PORT command includes the IP address and TCP port number that the remote computer 154 is to use in contacting the application program 156. In this example, the application program 156 has chosen port number 8002. The application program 156 also opens a second socket 190 for receiving data from the remote computer 154 at IP address 10.0.0.1, port 8002 (10.0.0.1/8002).

In response to receiving the PORT command from the application program 156, the TCP/IP stack 160 wraps the PORT command into an one or more packets having a source address of 10.0.0.1/3000 and a destination address of 10.0.0.5/21 and sends the packets to the firewall program 162 (arrow Q). The firewall engine 174 redirects the packets to the address 10.0.0.1/8000 in accordance with the first entry 184 of the connection module 177 (arrow R). The TCP/IP stack 160 sends the contents of the packets, which include the PORT command, to the proxy program 158 via the socket 170 (arrow S). The proxy program 158 responds by making a call to the firewall program 162 to have a new, third rule 188 entered into the rule module 176. The third rule 188 specifies that any packet having a source IP address of 10.0.0.5 (regardless of the source port), a destination IP address of 10.0.0.1 and a destination port 8002 is to be "redirected" to its original destination address and port. In effect, the proxy program 158 tells the firewall program 162 to simply pass such packets to their original destination without modification. The proxy program 158 then generates a PORT command that is identical to the one it received from the application program 156, and sends it to the TCP/IP stack 160 via the socket 171 (arrow T). The TCP/IP stack 160 wraps the PORT command into packets having a source address of 10.0.0.1/8001 and a destination address of 10.0.0.5/21 (arrow U). The packets are then sent to the remote computer 154 via the TCP/IP stack 160 (arrow V).

Figure 8:
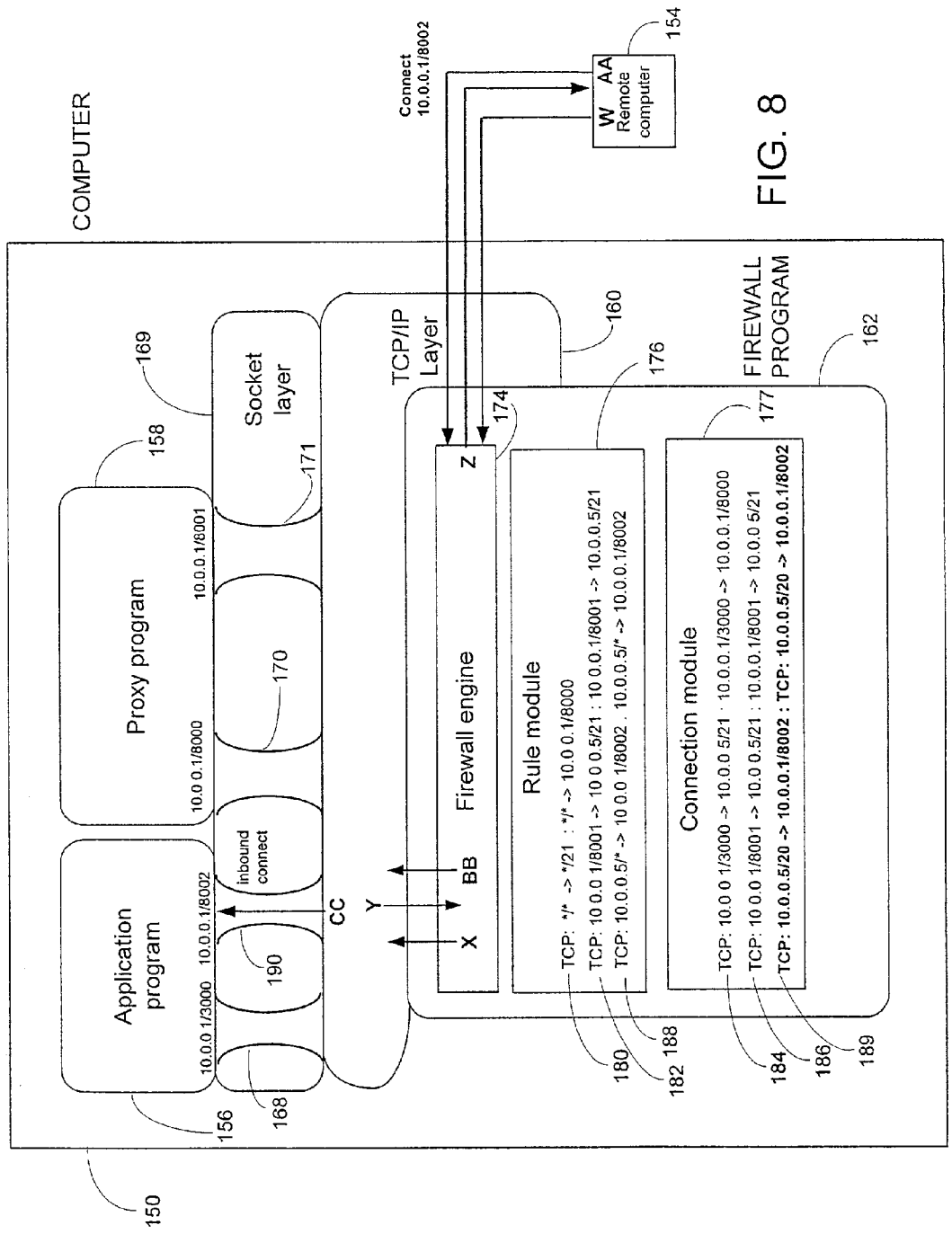

Referring to FIG. 8, the remote computer 154 responds to the PORT command by attempting to connect to the local computer 150 at address 10.0.0.1/8002. Accordingly, the remote computer 154 sends a SYN packet to the computer 150, having a source address of 10.0.0.5, port 20 (10.0.0.5/20) and a destination address of 10.0.0.1, port 8002 (10.0.0.1/8002) (arrow W). Port 20 is often used by FTP server programs as a port from which to send data, though other ports may also be used for this purpose. The SYN packet reaches the firewall program 162 via the TCP/IP stack 160. The firewall engine 174 then processes the packet by referring to the connection module 177 to determine whether there is a current connection entry for handling this packet. Finding none, the firewall engine 174 refers to the rule module 176 to determine if there are any rules defined for handling this packet. The firewall engine 174 finds that the third rule 188 applies, and "redirects" the SYN packet accordingly. In effect, the firewall engine 174 allows the SYN packet to pass unaltered to the TCP/IP stack 160 (arrow X). The firewall engine 174 also creates a third connection entry 189 in the connection module 177 that indicates the existence of an active connection between IP address 10.0.0.5, port 20 (10.0.0.5/20) and IP address 10.0.0.1, port 8002 (10.0.0.1/8002).

The TCP/IP stack 160 responds to the SYN packet by generating a SYN/ACK packet having a source address of 10.0.0.1/8002 and a destination address of 10.0.0.5/20 (arrow Y). The SYN/ACK packet reaches the firewall program 162, and processed by the firewall engine 174. The firewall engine 174 checks the connection module 177 and finds the third connection entry 189, indicating that there is a corresponding, active connection. The firewall engine 174 then relays the SYN/ACK packet to the remote computer 154 via the TCP/IP layer 160 (arrow Z). The remote computer 154 responds to the SYN/ACK packet by transmitting an ACK packet to the local computer 150 (arrow AA). The ACK packet goes through the TCP/IP layer 160 and reaches the firewall program 162. The firewall engine 174 sends the ACK packet onto the TCP/IP layer 160 according to the third connection entry 189 of the connection module 177. From this point on, the firewall engine 174 allows communication between the remote computer 154 and the application program 156 based on the entry 189.

It can thus be seen that a new a useful method and apparatus for regulating access to a computer via a computer network has been provided. In view of the many possible embodiments to which the principles of this invention may be applied, it should be recognized that the embodiments described herein with respect to the drawing figures is meant to be illustrative only and should not be taken as limiting the scope of invention. For example, those of skill in the art will recognize that the elements of the illustrated embodiments shown in software may be implemented in hardware and vice versa or that the illustrated embodiments can be modified in arrangement and detail without departing from the spirit of the invention. Therefore, the invention as described herein contemplates all such embodiments as may come within the scope of the following claims and equivalents thereof.

What is claimed is:

1. A method for regulating access to a computer via a computer network, the method comprising:
   on a local computer:
   detecting an attempt to send a message from an application program on the local computer to a remote computer;
   determining whether the message contains a request for the remote computer to contact the local computer; and
   based on the determining step, changing a setting of a security program residing on the local computer from a state in which the security program blocks communication packets that are destined for the local computer to a state in which the security program admits packets destined for the local computer,
   wherein the local computer is not a network device that is designed primarily to handle network traffic.

2. A computer storage medium having stored thereon computer-executable instructions for performing the method of claim 1.

3. The method of claim 1, wherein the security program forwards and blocks communication packets based on a set of rules, and wherein the changing step comprises adding a new rule to the set of rules, the new rule specifying that communication packets coming from the remote computer and destined for the local computer are to be forwarded to the application program residing on the local computer, the application program being the originator of the message.

4. The method of claim 1, wherein the message originates from an application program on the local computer, the method further comprising:
   sending the message to the remote computer on behalf of the application program.

5. The method of claim 3, wherein the detecting step is performed by a proxy program residing on the local computer, the message is an FTP message,
   wherein the determining step comprises:
   determining whether the message contains an FTP PORT command; and
   wherein the changing step comprises creating a rule for the security program that permits packets received from the remote computer to reach the application program.

6. The method of claim 1, wherein the message originates from an application program executing on the local computer, and the detecting, determining and changing steps are performed by a proxy program executing on the local computer in a manner that is transparent to the application program.

7. An apparatus for regulating the entry of data traffic from a computer network, the apparatus comprising:
   a local computer executing programs comprising:
   an application program;
   a firewall program configured to prevent inbound messages from reaching the application program; and
   a proxy program, wherein the proxy program performs the steps of:
   analyzing outbound messages generated by the application program to determine whether or not they indicate that the application program requires a remote computer on the computer network to connect back to the local computer;
   based on the analyzing step, reconfiguring the firewall program to allow the remote computer to connect back to the local computer,
   wherein the local computer is not a network device that is designed primarily to handle network traffic.

8. The apparatus to claim 7, wherein the firewall program executes according to a set of rules, and wherein the proxy program reconfigures the firewall program by adding a new rule to the set of rules, the new rule specifying that inbound messages received from the remote computer are to be permitted to reach the application program.

9. The apparatus of claim 7, wherein the firewall program is further configured to route outbound messages to the proxy program, and wherein the proxy program performs further steps comprising:
   after the analyzing step, reconfiguring the firewall program to permit outbound messages received from the proxy program to reach the computer network; and
   passing the outbound messages generated by the application program to the firewall program.

10. The apparatus of claim 9, wherein the firewall program executes according to a set of rules, and wherein the step of reconfiguring the firewall program to permit outbound messages received from the proxy program to reach the computer network comprises adding a new rule to the set of rules.

11. The apparatus of claim 7, wherein the firewall program performs steps comprising:
   for each inbound and outbound packet, determining whether an active connection is defined for the source and destination addresses of the packet;
   if an active connection is determined to be defined for the source and destination addresses of the packet, permitting the packet to pass to its original destination;
   if no active connection is determined to be defined for source and destination addresses of the packet, determining whether a rule is defined for the source and destination addresses of the packet;
   if a rule is determined to be defined for the source and destination address of the packet, processing the packet according to the rule; and
   if no rule is determined to be defined for the source and destination address of the packet, blocking the packet from further transmission.

12. A method for regulating access to a local computer via a computer network, wherein the local computer executes a client application program and a proxy program, the local computer method comprising:
   receiving one or more outbound communication packets;
   determining whether the outbound communication packets are part of an attempt by the application program to solicit a remote computer on the network to initiate a connection with the local computer;
   based on the determining step, redirecting the outbound communication packets to the proxy program;
   in response to a function call from the proxy program indicating that the outbound communication packets are to be permitted to be sent to the remote computer, permitting the outbound communication packets to be transmitted to the remote computer,
   blocking inbound communication packets that are received from the network and that are destined for ports on the local computer from which no outbound packets have recently been sent; and
   in response to a function call from the proxy program indicating that inbound communication packets are to be permitted to pass to the application program, permitting the inbound communication packets to pass to the application program, and
   wherein the local computer is not a network device that is designed primarily to handle network traffic.

13. A computer storage medium having stored thereon computer-executable instructions for performing the method of claim 12.

14. The method of claim 12, wherein the determining step comprises determining whether the destination port of the outbound communication packets is a well-known port used by a communication protocol for which a new, inbound connection is required from the remote computer.

15. The method of claim 12, wherein the determining step comprises comparing the destination address and port of the outbound communication packets with a set of rules to determine whether any of the set of rules applies to the outbound communication packets.

16. The method of claim 12, wherein the receiving step comprises receiving outbound communication packets from the application program and the method further comprises:
   after the step of redirecting the outbound communications packets to the proxy program, receiving the outbound communications packets back from the proxy program.

17. The method of claim 12, further comprising:
   receiving inbound communications packets from the remote computer;
   determining whether there is already an active connection between the application program and the remote computer; and
   if it is determined that there is an active connection between the application program and the remote computer, allowing the inbound packets to reach the application program.

18. The method of claim 12, further comprising:
   receiving inbound communications packets from the remote computer;
   determining whether there is already an active connection between the proxy program and the remote computer; and
   if it is determined that there is an active connection between the application program and the remote computer, allowing the inbound packets to reach the application program.

19. An apparatus for regulating the entry of messages from a computer network, the apparatus comprising:
   a local computer executing a proxy program that performs steps comprising:
      preventing inbound messages from reaching an application program residing on the local computer;
      analyzing outbound messages generated by the application program to determine whether or not they indicate that the application program requires a remote computer on the computer network to connect back to the local computer; and
      based on the analyzing step, allowing the remote computer to connect back to the local computer,
   wherein the local computer is not a network device that is designed primarily to handle network traffic.

20. The apparatus of claim 19, wherein the program executes according to a set of rules, and wherein the program performs the allowing step by adding a new rule to the set of rules, the new rule specifying that inbound messages received from the remote computer are permitted to reach the application program.

21. A local computer system for regulating access to a computer via a computer network, the system comprising:
   means for detecting an attempt to send a message from an application program on a local computer to a remote computer;
   means for determining whether the message contains a request for the remote computer to contact the local computer; and
   means for changing, based on input from the determining means, a setting of a security program residing on the local computer from a state in which the security program blocks communication packets that are destined for the local computer to a state in which the security program admits packets destined for the local computer,
   wherein the local computer is not a network device that is designed primarily to handle network traffic.

22. The system of claim 21, wherein the security program forwards and blocks communication packets based on a set of rules, and wherein the changing means comprises a means for adding a new rule to the set of rules, the new rules specifying that communication packets coming from the remote computer and destined for the local computer are to be forwarded to the application program residing on the local computer, the application program being the originator of the message.

* * * * *

UNITED STATES PATENT AND TRADEMARK OFFICE
CERTIFICATE OF CORRECTION

| | | |
|---|---|---|
| PATENT NO. | : 7,822,970 B2 | Page 1 of 1 |
| APPLICATION NO. | : 10/000606 | |
| DATED | : October 26, 2010 | |
| INVENTOR(S) | : Jonathan Burstein | |

It is certified that error appears in the above-identified patent and that said Letters Patent is hereby corrected as shown below:

In column 1, line 40, after "Internet" insert -- from an FTP host, the FTP client needs to contact the host on one TCP port and, using the --.

In column 12, line 37, in Claim 22, delete "rules" and insert -- rule --, therefor.

Signed and Sealed this

Fifteenth Day of February, 2011

David J. Kappos
*Director of the United States Patent and Trademark Office*